US012744166B2

(12) United States Patent
Moon et al.

(10) Patent No.: US 12,744,166 B2
(45) Date of Patent: Sep. 22, 2026

(54) COMPOSITE MATERIAL FOR ELECTRICAL CONTACTS AND METHOD OF PRODUCING SAME

(71) Applicants: LS ELECTRIC CO., LTD., Anyang-si (KR); APPLIED CARBON NANO TECHNOLOGY CO., LTD., Pohang-si (KR)

(72) Inventors: Chul Dong Moon, Anyang-si (KR); Wook Dong Cho, Anyang-si (KR); Won Young Kim, Anyang-si (KR)

(73) Assignees: LS ELECTRIC CO., LTD., Anyang-si (KR); APPLIED CARBON NANO TECHNOLOGY CO., LTD., Pohang-si (KR)

( * ) Notice: Subject to any disclaimer, the term of this patent is extended or adjusted under 35 U.S.C. 154(b) by 420 days.

(21) Appl. No.: 18/283,178

(22) PCT Filed: Nov. 24, 2021

(86) PCT No.: PCT/KR2021/017363
§ 371 (c)(1),
(2) Date: Sep. 20, 2023

(87) PCT Pub. No.: WO2022/203154
PCT Pub. Date: Sep. 29, 2022

(65) Prior Publication Data

US 2024/0177944 A1 May 30, 2024

(30) Foreign Application Priority Data

Mar. 23, 2021 (KR) ........................ 10-2021-0037278

(51) Int. Cl.
*H01H 1/027* (2006.01)
*B22F 1/00* (2022.01)
(Continued)

(52) U.S. Cl.
CPC ............... *H01H 1/027* (2013.01); *B22F 1/09* (2022.01); *B22F 1/12* (2022.01); *B22F 3/20* (2013.01);
(Continued)

(58) Field of Classification Search
CPC ................. H01H 1/027; H01H 11/048; H01H 2300/036; H01H 1/023; H01H 11/04;
(Continued)

(56) References Cited

U.S. PATENT DOCUMENTS

| | | | | |
|---|---|---|---|---|
| 9,570,207 | B2 * | 2/2017 | Park | C04B 35/66 |
| 10,361,052 | B1 | 7/2019 | Rodriguez Salinas | |

FOREIGN PATENT DOCUMENTS

| | | | | | |
|---|---|---|---|---|---|
| JP | 2015105439 | A | | 6/2015 | |
| JP | 2015-125936 | A | | 7/2015 | |
| KR | 2015-0063272 | A | | 6/2015 | |
| KR | 20150103569 | A | * | 9/2015 | H01H 11/04 |
| KR | 2016-0136884 | A | | 11/2016 | |

OTHER PUBLICATIONS

International Search Report for related International Application No. PCT/KR2021/017363, dated Mar. 10, 2022; 2 pages.

(Continued)

*Primary Examiner* — Ricardo D Morales
(74) *Attorney, Agent, or Firm* — K&L Gates LLP

(57) ABSTRACT

The present disclosure relates to an electrical contact material that is a contact element that plays a role of blocking or allowing the flow of an electric circuit to pass through, and relates to an electrical contact composite material that satisfies the physical properties required to use as an electrical contact while reducing Ag content, and a method for manufacturing the same.

8 Claims, 6 Drawing Sheets

(51) Int. Cl.
*B22F 1/12* (2022.01)
*B22F 3/20* (2006.01)
*B22F 3/24* (2006.01)
*B22F 9/04* (2006.01)

(52) U.S. Cl.
CPC .................. *B22F 3/24* (2013.01); *B22F 9/04* (2013.01); *B22F 2003/248* (2013.01); *B22F 2301/15* (2013.01); *B22F 2301/255* (2013.01); *B22F 2302/403* (2013.01); *B22F 2304/10* (2013.01); *B22F 2998/10* (2013.01); *B22F 2999/00* (2013.01)

(58) Field of Classification Search
CPC ...... B22F 1/09; B22F 1/12; B22F 3/20; B22F 3/24; B22F 9/04; B22F 2003/248; B22F 2301/15; B22F 2301/255; B22F 2302/403; B22F 2304/10; B22F 2998/10; B22F 2999/00; C22C 5/06
See application file for complete search history.

(56) References Cited

OTHER PUBLICATIONS

Written Opinion for related International Application No. PCT/KR2021/017363, action dated Mar. 10, 2022; 5 Pages.
Office Action for related Japanese Application No. 2023-544494; action dated Jun. 4, 2024; (4 pages).

* cited by examiner

COMPOSITE MATERIAL FOR ELECTRICAL CONTACTS AND METHOD OF PRODUCING SAME

CROSS-REFERENCE TO RELATED APPLICATION

This application is a National Stage of International Application No. PCT/KR2021/017363, filed on Nov. 24, 2021, which claims priority to and the benefit of Korean Patent Application No. 10-2021-0037278, filed on Mar. 23, 2021, the disclosure of which is incorporated herein by reference in its entirety.

FIELD

The present disclosure relates to an electrical contact material that is a contact element that plays a role of blocking or allowing the flow of an electric circuit to pass through, and relates to an electrical contact composite material (or an electrical contact material) and a method of manufacturing the same, and relates to an disclosure capable of manufacturing various applications for power equipment products (e.g., contactors, switchgears, circuit breakers, and the like).

BACKGROUND

The electrical contact is a contact element that functions to allow or block the flow of an electric circuit of a product. Such an electrical contact is used in various ways in contactors, switchgears, circuit breakers, relays, switches, and the like, which are power equipments.

The electrical contact requires excellent thermal conductivity and electrical conductivity characteristics for electric-current-conducting, and a high melting point and thermally stable characteristics to minimize shape damage and fusion due to arcs when electricity is blocked.

The electrical contact material is used based on a silver (Ag) material having excellent electrical conductivity, such as AgCdO-based, $AgSnO_2$-based, AgNi-based, AgWC-based, AgC-based, AgNiC-based, AgZnO-based, and the like. In the case of an electromagnetic contactor that is a power equipment product in the domestic power distribution industry, an AgCdO-based electrical contact containing an environmental regulatory element is used. And, in the case of a circuit breaker, some AgCdO-based ones are used, and AgWC-based, AgC-based, and AgNiC-based electrical contacts are used. In the case of an electromagnetic contactor that is a power equipment product in the overseas power distribution industry, an AgCdO-based and $AgSnO_2$-based electrical contacts are used depending on the country of use, and in the case of a circuit breaker, an AgWC-based, AgC-based, and AgNiC-based electrical contacts are used.

The electrical contact applied in the power distribution industry accounts for a high-cost part in the final product. This is because the raw material used for the electrical contact is based on silver (Ag), which is a noble metal material. Since it is a noble metal material, it basically has a high price range, and the price change of silver directly affects the price of the electrical contact. In general, a silver content in the AgCdO-based, $AgSnO_2$-based, AgC-based, and AgNiC-based electrical contacts provided by the domestic and foreign electrical contact companies is about 80% or more as shown in Table 1.

TABLE 1

| Ag content in electrical contact (wt. %) | L company | S company | M company | U company |
|---|---|---|---|---|
| AgCdO-based | 80% or more | 80% or more | 80% or more | 80% or more |
| $AgSnO_2$-based | 80% or more | 80% or more | 80% or more | 80% or more |
| AgC-based | 90% or more | 90% or more | 90% or more | 90% or more |
| AgNiC-based | 90% or more | 90% or more | 90% or more | 90% or more |

Accordingly, many efforts and developments have been made by the electrical contact companies to reduce the content of Ag occupying a high proportion while maintaining the characteristics of the electrical contact by using new technologies, new processes, and new materials.

SUMMARY

The present disclosure has been devised to solve the above problems, and is directed to providing a composite material for electrical contact having an optimal composition and composition ratio satisfying mechanical properties, electrical characteristics, and thermal characteristics required as an electrical contact material while lowering the Ag content in the electrical contact material, and a method for manufacturing the composite material for electrical contact.

In order to solve the above problems, the composite material for electrical contact according to an embodiment of the present disclosure includes a silver (Ag) powder; a metal-based powder; and an Ag/C composite powder including silver (Ag) and a carbon-based nanofiller.

In a preferred embodiment of the present disclosure, the metal-based powder may include at least one selected from nickel (Ni), tungsten (W), and tungsten carbide (WC).

In a preferred embodiment of the present disclosure, the Ag/C composite powder may be a material integrated by incorporating and dispersing carbon-based nanofillers in the Ag powder, and the Ag/C composite powder may have a density of 8.40 to 9.50 g/$cm^3$.

In a preferred embodiment of the present disclosure, the composite material for electrical contact of the present disclosure may include 60 to 70 wt. % of the silver powder, 1 to 5 wt. % of the Ag/C composite powder, and the balance of the metal-based powder.

In a preferred embodiment of the present disclosure, the composite material for electrical contact of the present disclosure may be a workpiece obtained by sintering, rolling, or extrusion processing the above-described composite material.

In a preferred embodiment of the present disclosure, the composite material as the workpiece may have a density of 9.550 to 9.950 g/$cm^3$, an electrical conductivity of 46 to 52% IACS, and a Vickers hardness of 91.0 to 95.0 HV.

In a preferred embodiment of the present disclosure, the composite material as the workpiece may satisfy 230.0 to 285.0 W/(m·K) at 25° C., 230.0 to 280.0 W/(m·K) at 40° C., 225.0 to 275.0 W/(m·K) at 60° ° C., 220.0 to 270.0 W/(m·K) at 80° C., and 215.0 to 265.0 W/(m·K) at 90° C., when measuring thermal conductivity.

The present disclosure is also directed to providing a method for manufacturing the composite material for electrical contact, and the method may include performing a process, including: mixing a silver (Ag) powder, a metal-based powder, and an Ag/C composite powder including silver (Ag) and a carbon-based nanofiller to prepare a mixed powder; preparing a workpiece by sintering, rolling, or extruding the mixed powder; and heat-treating the workpiece.

In a preferred embodiment of the present disclosure, the Ag/C composite powder may be prepared by performing a process, including: mixing the Ag powder and the carbon-based nanofiller, and then preparing a mixture obtained by performing low energy milling; and performing high energy milling on the mixture obtained by performing the low energy milling.

In a preferred embodiment of the present disclosure, the low energy milling and the high energy milling may be performed independently by attrition milling, planetary milling, jet milling, or disc milling.

In a preferred embodiment of the present disclosure, the low energy milling may be performed by attrition milling for 1 to 60 minutes under a condition of 100 to 200 rpm.

In a preferred embodiment of the present disclosure, the high energy milling may be performed by attrition milling for 4 to 24 hours under a condition of 400 to 600 rpm.

The electrical contact material of the present disclosure can have a great decrease in Ag content occupying a high proportion in the electrical contact, thereby securing economic efficiency, and can satisfy mechanical, electrical and thermal properties required as the electrical contact material despite the low Ag content. Further, by improving the complexity of the manufacturing process prepared by the conventional chemical method and the problem of mass production, cost reduction of a power equipment product can be realized.

DETAILED DESCRIPTION

Figure 1:
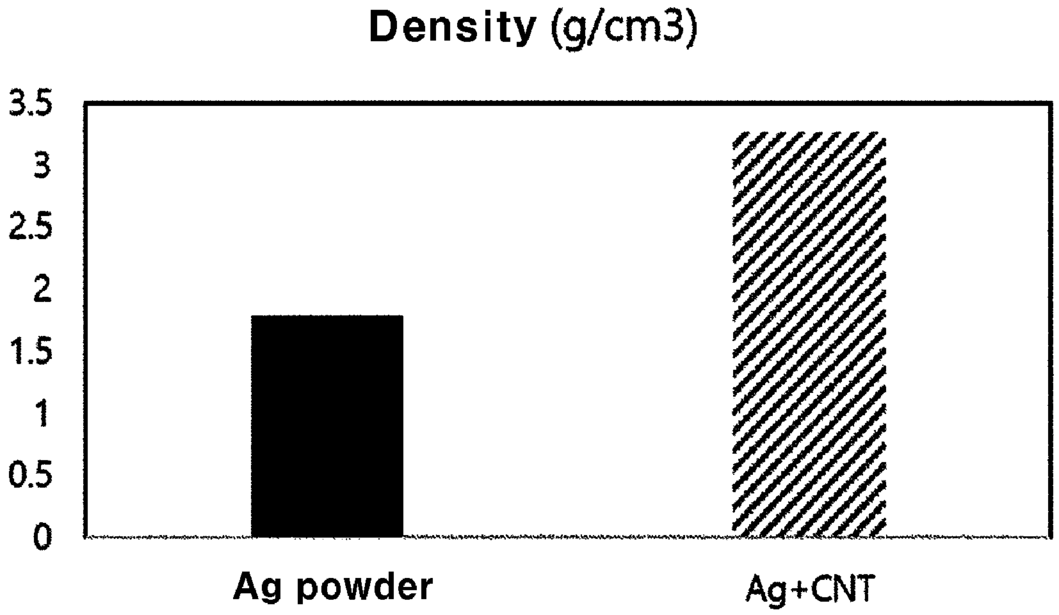
FIG. 1 is a result of measuring the density of the Ag/C composite powder and the Ag powder prepared in Preparation Example 1.

Hereinafter, the present disclosure will be described in detail through a method of manufacturing a composite material for electrical contact (or an electrical contact material) of the present disclosure.

The present disclosure is an composite material for electrical contact manufactured using a composition incorporating Ag/C composite powder prepared by a specific method in order to reduce the Ag content in the electrical contact material.

The composite material for electrical contact of the present disclosure may be provided in the form of a mixed powder in which the composite material composition for electrical contact is mixed.

In addition, the composite material for electrical contact of the present disclosure may be provided in the form of a workpiece having a predetermined shape, not a powder type, by performing a process including: a first step of mixing an composite composition material for electrical contact to prepare a mixed powder; a second step of processing the mixed powder to prepare a workpiece; and a third step of heat-treating the workpiece.

In addition, the process may further include a fourth step of cutting the workpiece heat-treated in the third step.

First, the composite material for electrical contact of the first step will be described.

The composite material for electrical contact (or composition) includes Ag powder, metal-based powder, and Ag/C composite powder.

The content of the Ag powder in the composite material for electrical contact is 60 to 70% by weight, preferably 60.0 to 67.0% by weight, more preferably 62 to 65% by weight, based on the total weight of the composition, and in this case, if the content of the Ag powder is less than 60% by weight, there may be a problem in that the electrical conductivity of the composite material for electrical contact is too low, if the content of the Ag powder exceeds 70% by weight, there may be a problem in that the effect of securing economic feasibility due to the effect of reducing the amount of Ag in the composite material for electrical contact is insufficient, and hardness become rather too low, and thus the composite material for electrical contact is preferably used within the above range.

In addition, the Ag powder may be used having a particle diameter of 200 μm or less, preferably 5 to 120 μm, and more preferably 5 to 50 μm, and if the particle diameter of the Ag powder is greater than 200 μm, the mixing ability with other powders in the composition is insufficient, and other components other than Ag may not be evenly distributed in the electrical contact material, and thus the Ag powder having a particle diameter in the above range is preferably used.

Next, the metal-based powder is used to improve mechanical properties such as abrasion resistance of an electrical contact, and may include at least one selected from nickel (Ni), tungsten (W), and tungsten carbide (WC), and preferably include at least one selected from nickel and tungsten. In addition, the content of the metal-based powder in the composition is the remaining amount of the composition 100% by weight excluding the Ag powder and the Ag/C composite powder.

Next, the Ag/C composite powder is a material integrated by inserting and dispersing carbon-based nanofillers into the Ag powder, and may be manufactured by the following method.

The Ag/C composite powder may be manufactured by performing a first step of mixing Ag powder and carbon-based nanofillers and then preparing a mixture obtained by performing low energy milling; and a second step of performing high energy milling of the mixture obtained by performing low energy milling.

In the Ag/C composite powder preparation method, the mixture in the first step is obtained by dry mixing Ag powder and carbon-based nanofillers, and may include 1 to 5 wt. % of the carbon-based nanofiller and the balance of Ag powder, preferably, 2 to 5 wt. % of the carbon-based nanofiller and the balance of Ag powder, more preferably, 2.5 to 4.0 wt. % of the carbon-based nanofiller and the balance of Ag powder. In this case, if the content of the carbon-based nanofiller is less than 1 wt. %, mechanical properties or the like of the electrical contact material prepared using the Ag/C composite powder may be poor, and if the content of the carbon-based nanofiller is greater than 5 wt. %, mechanical properties of the electrical contact material may be excellent, but electrical conductivity may be too low, and thus it is preferable that the mixture is preferably used within the above range.

The Ag powder may have a particle diameter of 200 μm or less, preferably, 5 to 120 μm, more preferably, 5 to 50 μm.

In addition, the carbon-based nanofiller may include at least one selected from single-walled carbon nanotubes (CNTs), multi-walled carbon nanotubes and graphene, preferably, at least one selected from single-walled CNTs and multi-walled CNTs, more preferably, multi-walled CNTs, and still more preferably, multi-walled CNTs having a purity of 85 to 95% and a density of 1.20 to 1.40 $g/cm^3$.

The low energy milling in the first step is performed to uniformly disperse the carbon-based nanofiller on the surface of the Ag powder, and the low energy milling may be performed by attrition milling, planetary milling, jet milling or disc milling, preferably, attrition milling.

In addition, when the low energy milling is performed by attrition milling, the low energy milling may be performed at 100 to 200 rpm for 1 to 60 minutes, preferably, at 100 to 180 rpm for 1 to 50 minutes, more preferably, at 100 to 160 rpm for 1 to 40 minutes.

The second step is a process of preparing an integrated material (Ag/C composite powder) by performing high energy milling of the mixture obtained by performing low energy milling, and inserting the carbon-based nanofiller dispersed on the surface of the Ag powder into the Ag powder.

The high energy milling may be performed by attrition milling, planetary milling, jet milling or disc milling, preferably, attrition milling.

In addition, when the high energy milling is performed by attrition milling, the high energy milling may be performed at 400 to 600 rpm for 4 to 24 hours, preferably, at 400 to 550 rpm for 4 to 20 hours, more preferably, at 400 to 500 rpm for 4 to 16 hours. In this case, if less than 400 rpm or less, or the milling time is less than 4 hours, there may be a problem in that a plurality of cases where the carbon-based nanofiller is not inserted into the Ag powder which is the base material may occur, and if more than 600 rpm, there may be a problem in that the shape of the Ag/C composite powder is not uniform, and if the milling time is greater than 24 hours, it is uneconomical, and thus it is preferable to perform high energy milling under the above conditions.

The particle diameter of the Ag/C composite powder thus prepared has a particle diameter substantially similar to that of the Ag powder used in the preparation, but the density is lowered. Specifically, the Ag powder has a density of about 10.1 to 10.4 $g/cm^3$, and may differ depending on the carbon-based nanofiller, but the Ag/C composite powder prepared from the multi-walled CNT may have a density of 8.40 to 9.50 $g/cm^3$, preferably 8.40 to 9.35 $g/cm^3$, more preferably 8.45 to 9.20 $g/cm^3$.

Next, the second step is a process of manufacturing a workpiece by sintering, rolling or extrusion processing the mixed powder prepared in the first step, depending on the use and shape (e.g., plate shape, wire shape, strip shape, rivet shape) of the composite material for electrical contact to be prepared.

And, the third step is a step of heat-treating the workpiece, and the heat treatment is performed to improve physical properties by heat-treating the workpiece according to the purpose of use, and may be performed under the heat treatment method and conditions generally performed in the art, and as a preferred example, the heat treatment may be performed in an inert atmosphere and 300 to 500° C. for 1 to 2 hours. In this case, since the carbon-based nanofiller is not carbonized by heat even at a high temperature when the heat treatment is performed under an inert atmosphere such as Ar, $N_2$, and the like, the heat treatment needs to be performed under an inert atmosphere.

Further, the final electrical contact product may be manufactured by cutting the heat-treated workpiece into a desired shape and size.

The composite material for electrical contact according to the present disclosure may include 0.02 to 0.90 wt. %, preferably 0.04 to 0.65 wt. %, more preferably 0.04 to 0.40 wt. % of the carbon-based nanofiller in the total weight of the composite material.

Further, the composite material for electrical contact in the form of the workpiece processed according to the present disclosure may have a density of 9.550 to 9.840 $g/cm^3$, preferably 9.600 to 9.830 $g/cm^3$, more preferably 9.650 to 9.800 $g/cm^3$.

In addition, the composite material for electrical contact in the form of the workpiece processed according to the present disclosure may have an electrical conductivity of 46 to 52% IACS (The International Annealed Copper Standard), preferably 46 to 50% IACS, more preferably 46.5 to 48.5% IACS.

In addition, the composite material for electrical contact in the form of the workpiece processed according to the present disclosure may have a Vickers hardness of 91.0 to 95.0 HV, preferably 91.5 to 95.0 HV, more preferably 91.5 to 94.5 HV.

In addition, when measuring thermal conductivity, the composite material for electrical contact in the form of the workpiece processed according to the present disclosure may satisfy 230.0 to 285.0 W/(m·K) at 25° C., 230.0 to 280.0 W/(m·K) at 40° ° C., 225.0 to 275.0 W/(m·K) at 60° ° C., 220.0 to 270.0 W/(m·K) at 80° C., and 215.0 to 265.0 W/(m·K) at 100° C., and preferably 234.0 to 283.0 W/(m·K) at 25° C., 234.0 to 278.0 W/(m·K) at 40° C., 230.0 to 274.0 W/(m·K) at 60° C., 224.0 to 270.0 W/(m·K) at 80° C., and 222.0 to 265.0 W/(m·K) at 100° ° C., and more preferably 242.0 to 282.0 W/(m·K) at 25° C., 238.0 to 277.0 W/(m·K) at 40° C., 235.0 to 274.0 W/(m·K) at 60° C., 232.0 to 268.0 W/(m·K) at 80° ° C., and 228.0 to 262.0 W/(m·K) at 100° C.

Hereinafter, the present disclosure will be described in more detail through the following examples, but the following examples are not intended to limit the scope of the present disclosure, which should be construed to aid understanding of the present disclosure.

EXAMPLES

Preparation Example 1: Preparation of Ag/C Composite Powder

Ag powder (density 10.2 $g/cm^3$, Tap density 1.7 to 1.8 $g/cm^3$) having a particle diameter of 63 μm or less and multi-walled carbon nanotubes (90% purity, density 1.3 $g/cm^3$, MWCNT) as carbon-based nanofillers were prepared, respectively.

Next, 97 wt. % of the Ag powder and 3 wt. % of the MWCNT were dry mixed, and then attrition milling was performed at about 120 to 150 rpm for 10 minutes, thereby preparing a mixture in which MWCNTs were evenly dispersed on the surface of the Ag powder.

Next, the mixture was subjected to attrition milling at about 400 to 450 rpm for 10 hours, and then the frictional heat generated during the milling process was cooled and stabilized, thereby obtaining Ag/C composite powder integrated by dispersing and inserting the MWCNTs into the Ag powder which is a base material.

(1) Tap Density Measurement

The density of the prepared Ag/C composite powder was 9.02 g/cm$^3$, and the Tap density was 3.0 g/cm$^3$. Referring to FIG. 1, it can be confirmed that the Tap density was very high compared to the Ag powder, this is because the Ag powder was hardly ground through high energy milling, and the density was lowered because the MWCNTs were inserted and integrated in the Ag powder.

(2) SEM Image Measurement

Figure 2A:
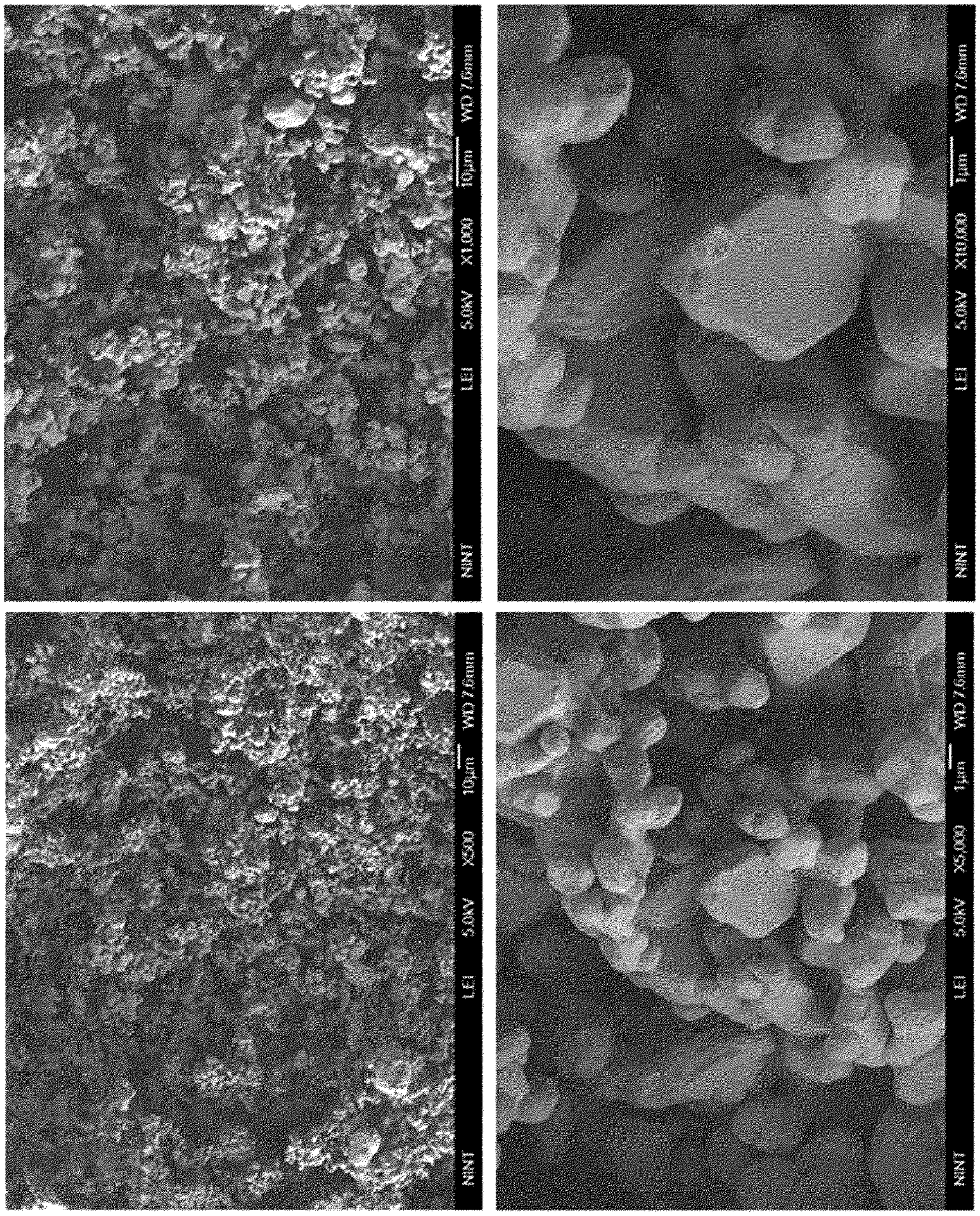
FIG. 2A is an SEM measurement image of the Ag powder.
Figure 2B:
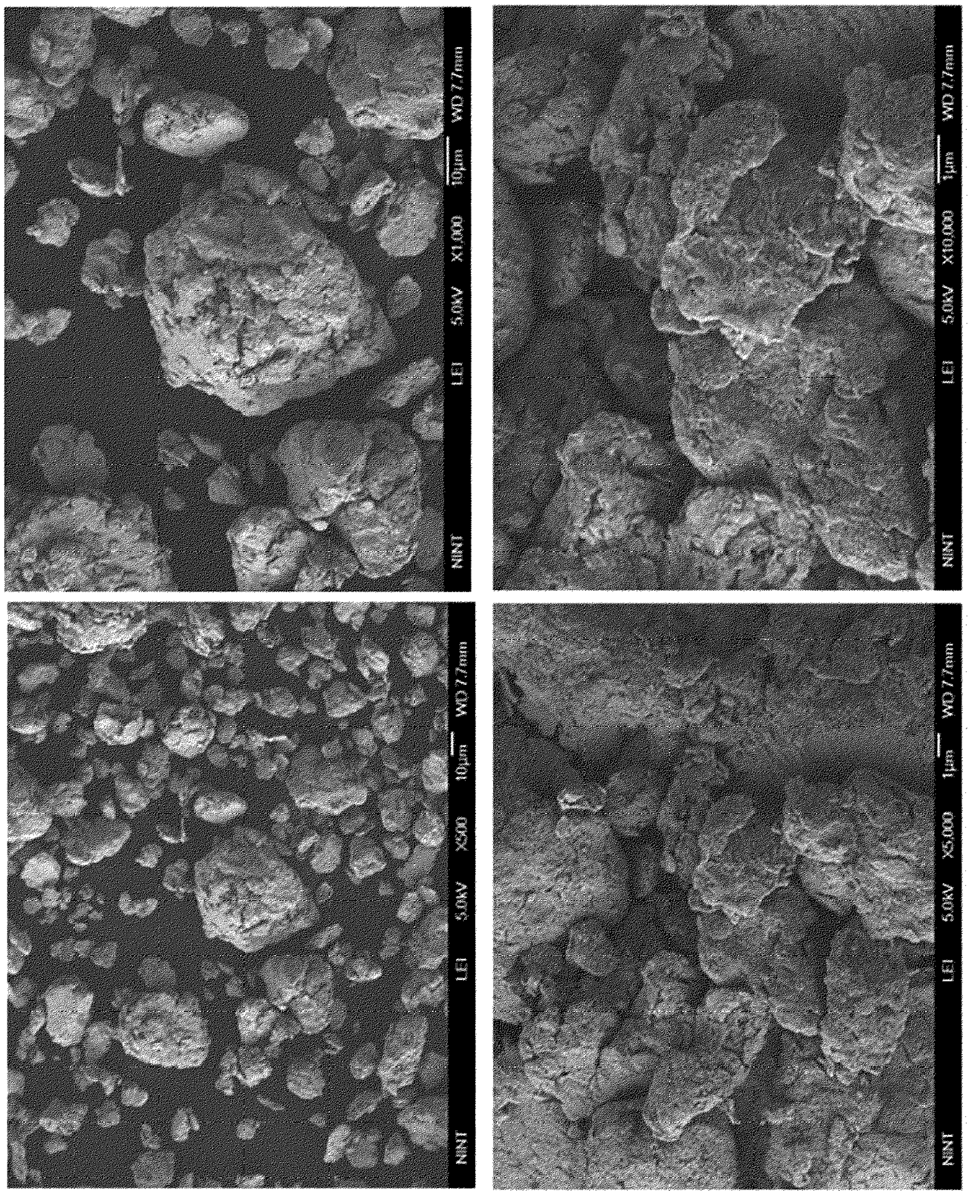
FIG. 2B is an SEM measurement image of the Ag/C composite powder prepared in Preparation Example 1.

In addition, SEM measurement images of the Ag powder and the prepared Ag/C composite powder are shown in FIGS. 2A and 2B. A is images of the Ag powder, and B is images of the Ag/C composite powder.

Referring to FIG. 2A, it can be confirmed that the Ag powder has an irregular particle shape and is greatly agglomerated. On the other hand, referring to FIG. 2B, it can be confirmed that the Ag/C composite powder has a shape close to a spherical shape as a whole. In addition, MWCNTs are not seen on the surface of the Ag/C composite powder, which means that the MWCNTs are completely inserted and dispersed in the Ag powder.

Through this, it can be confirmed that the Ag/C composite powder can be manufactured with high economic efficiency through a mechanical method rather than a complicated multi-step chemical method.

(3) Particle Size Change Measurement

Figure 3:
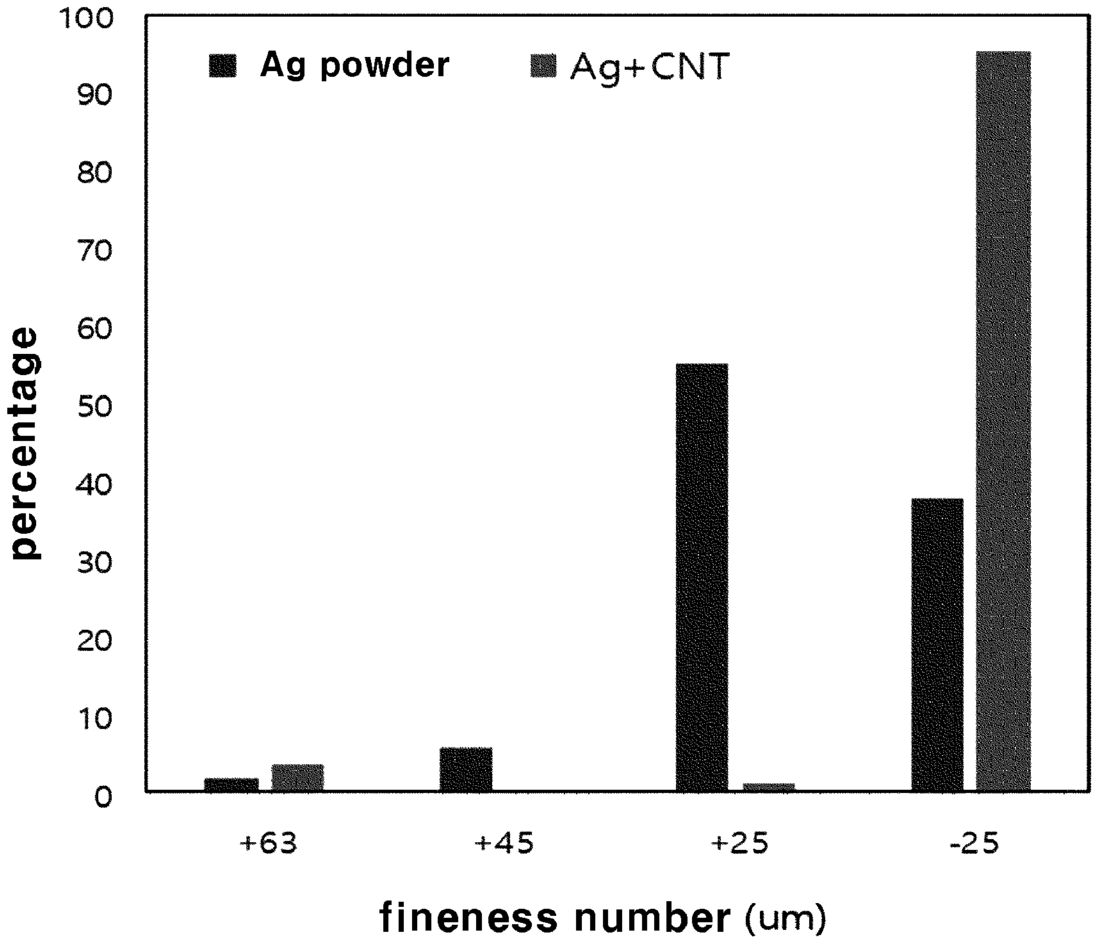
FIG. 3 is a result of measuring the particle size change of the Ag powder and the Ag/C composite powder prepared in Preparation Example 1.

In addition, the particle size changes of the Ag powder and the prepared Ag/C composite powder were measured, and the results are shown in FIG. 3.

Comparing the particle sizes of the Ag powder and the Ag/C composite powder before and after high energy milling, it can be seen that +25 μm and −25 μm of the Ag powder account for 90% or more of the total particle size. In comparison, it can be seen that −25 μm of the Ag/C composite powder account for 90% or more. The actual particle size of the Ag powder is prepared to be 25 μm or less, but because it is agglomerated in a manufacturing method, it can be seen that the Ag powder having a particle size of +25 μm is prepared, and it can be seen that the Ag/C composite powder prepared through high energy milling has particles separated from each other during the high energy milling, CNTs are inserted and dispersed into the particles and hardly agglomerated, and thus the powder having a particle size of +25 um or more decreased.

(4) Thermogravimetric Analysis (TGA)

Figure 4:
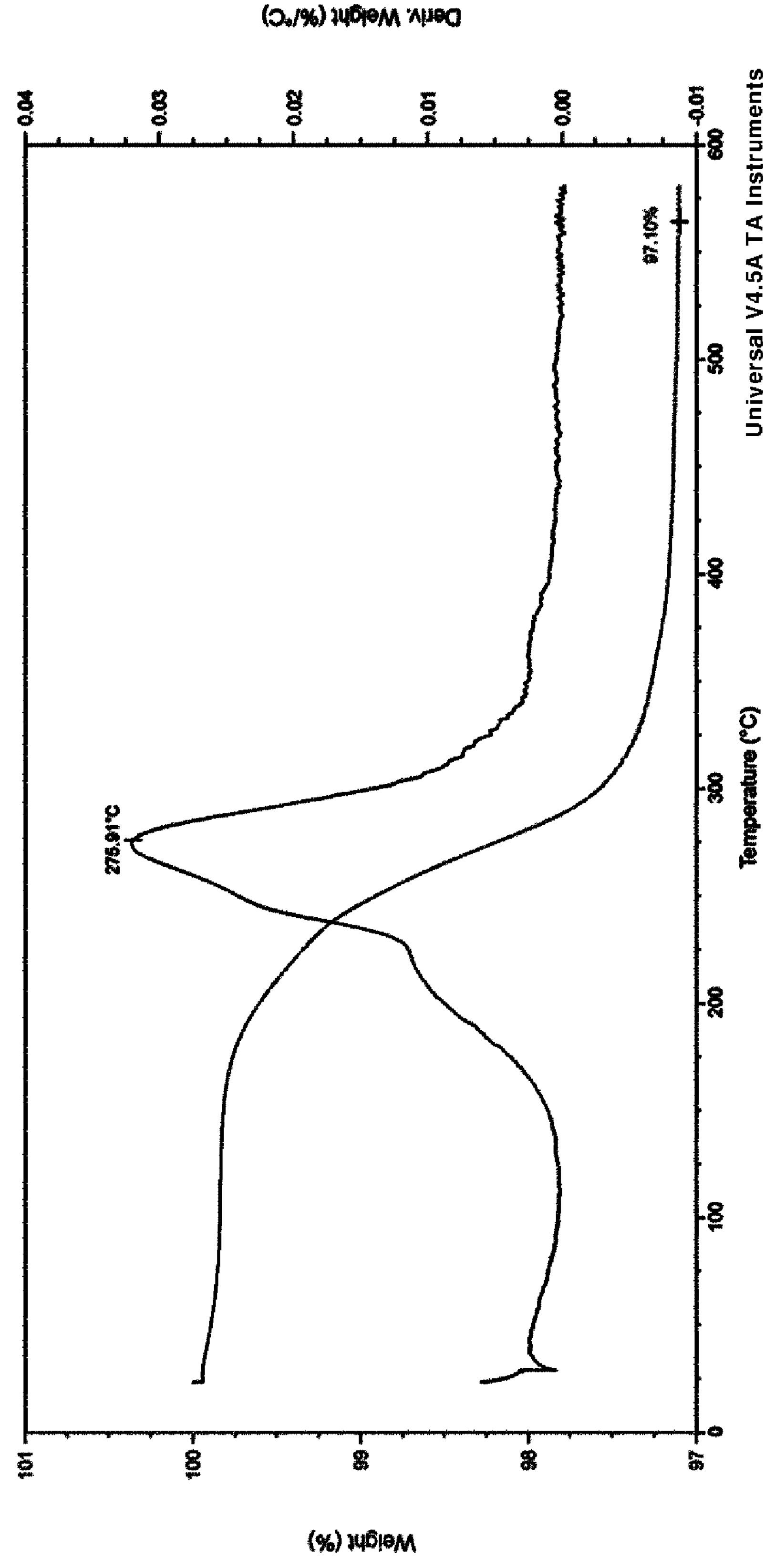
FIG. 4 is a result of measuring a thermogravimetric analysis of the Ag/C composite powder prepared in Preparation Example 1.

In order to confirm the presence or absence of the carbon-based nanofiller contained in the prepared Ag/C composite powder, a weight change according to temperature was measured under a condition of introducing oxygen, and the results are shown in FIG. 4.

Referring to FIG. 4, the carbon-based nanofiller contained in the Ag/C composite powder reacts to the internal condition while increasing the temperature. During this process, only the inserted carbon-based nanofillers are removed from the initial weight of 100% and the final remaining weight can be confirmed, and through this weight change, it was confirmed that the MWCNT was inserted and dispersed in the Ag in the prepared Ag/C composite powder.

Preparation Example 2

Ag/C composite powder was prepared by performing low energy and high energy milling in the same manner as in Preparation Example 1, but Ag/C composite powder was prepared as shown in Table 2 below using 95 wt. % of Ag powder and 5 wt. % of MWCNTs.

Preparation Example 3

Ag/C composite powder was prepared by performing low energy and high energy milling in the same manner as in Preparation Example 1, but using single-walled CNTs instead of multi-walled CNTs, Ag/C composite powder was prepared as shown in Table 2 below using 95 wt. % of Ag powder and 3 wt. % of single-walled CNTs.

TABLE 2

| Composition | Ag | Multi-walled CNT | Single-walled CNT | Density (g/cm$^3$) | Tap density (g/cm$^3$) |
|---|---|---|---|---|---|
| — | 100 wt. % | — | — | 10.2 | 1.7 to 1.8 |
| Preparation Example 1 | 97 wt. % | 3 wt. % | — | 9.02 | about 3.0 |
| Preparation Example 2 | 95 wt. % | 5 wt. % | — | 8.42 | about 2.7 |
| Preparation Example 3 | 97 wt. % | — | 3 wt. % | 8.99 | about 2.9 |

Experimental Example 1: Proper Ag and Ni Ratio Setting

A mixture was prepared by changing the mixing ratio of Ag powder having a particle diameter of 63 μm or less (density of 10.2 g/cm$^3$, Tap density of 1.7 to 1.8 g/cm$^3$) and Ni powder having a particle diameter of 45 μm or less, and then formed into a bulk-shaped billet, and then extruded.

Next, the workpiece prepared by extrusion was heat-treated under an inert atmosphere ($N_2$ atmosphere) at about 400° C., and then cut to prepare a plate-shaped electrical contact.

Figure 5:
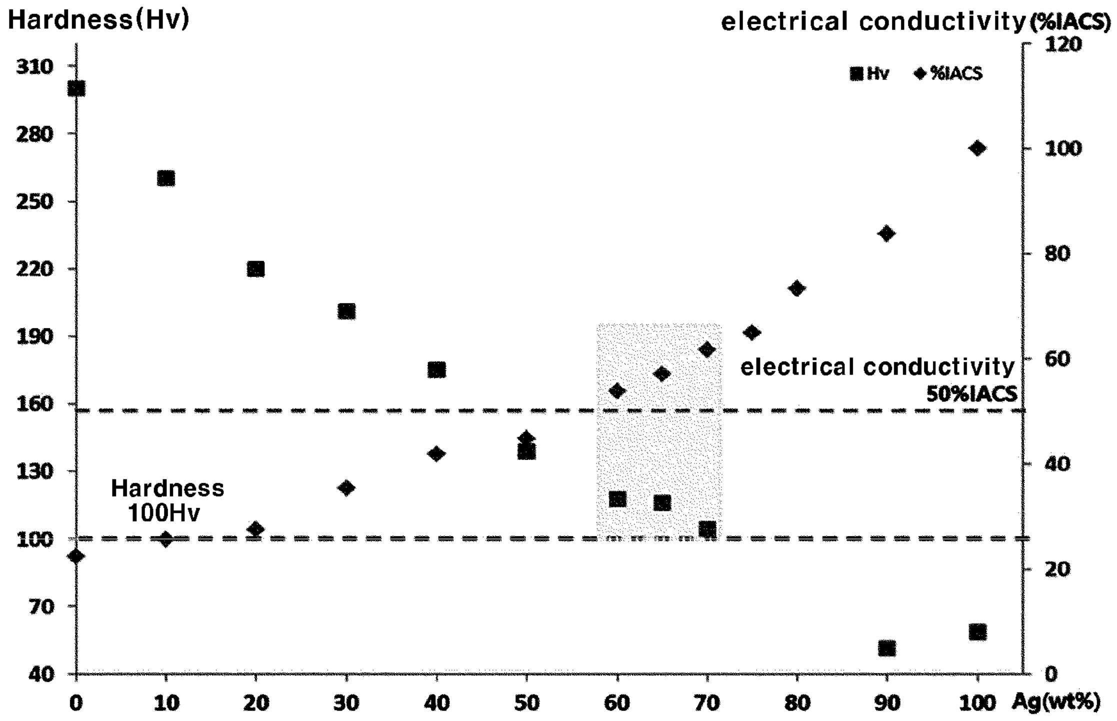
FIG. 5 is a result of measuring the electrical conductivity and hardness according to the ratio of Ag and Ni in the electrical contacts performed in Experimental Example 1.

Then, electrical conductivity (% IACS) and Vickers hardness (Hv) were measured for each of the electrical contacts prepared by varying the mixing ratio, and the results are shown in FIG. 5.

Referring to FIG. 5, it can be confirmed that the electrical contact including Ag in a range of about 60 to 70 wt. % satisfies a hardness of 100 Hv or more and has an electrical conductivity of 50% IACS or more.

Through this, it can be confirmed that when an electrical contact is prepared using Ag and Ni, a proper Ag content was about 60 to 70 wt. %, and in order to derive a method of satisfying the Ag content in this range and further reducing the Ag content, an amount of Ag powder and Ag/C composite powder used were variously designed to prepare composite materials for electrical contacts in the following examples.

Example 1: Preparation of a Composite Material for Electrical Contact (Workpiece)

Ag powder having a particle diameter of 63 μm or less (density of 10.2 g/cm$^3$, Tap density of 1.7 to 1.8 g/cm$^3$), Ni powder having a particle diameter of 45 μm or less, and Ag/C composite powder prepared in Preparation Example 1 were each prepared, and then mixed them to prepare a mixture.

Next, the mixture was made into a bulk-shaped billet, and then extruded.

Next, the workpiece prepared by extrusion was heat-treated under an inert atmosphere ($N_2$ atmosphere) at about 400° C., and then cut to prepare a plate-shaped electrical contact.

Examples 2 to 5 and Comparative Example 1

A composite material for electrical contact was prepared in the same manner as in Example 1, but as shown in Table 3 below, by varying the contents of Ag powder and Ag/C composite powder of Preparation Example 1, composite materials for electrical contacts were prepared, and Examples 2 to 4 and Comparative Example 1 were performed.

However, in Example 5, the Ag/C composite powder of Preparation Example 3 was used instead of Preparation Example 1.

TABLE 3

| Classification | Ag powder | Ni powder | Ag/C composite powder | Carbon-based nanofiller content in the total weight of the composite material |
|---|---|---|---|---|
| Comparative Example 1 | 65 wt. % | 35 wt. % | — | — |
| Example 1 | 63 wt. % | 35 wt. % | 2 wt. % (Preparation Example 1) | 0.06 wt. % |
| Example 2 | 62 wt. % | 35 wt. % | 3 wt. % (Preparation Example 1) | 0.09 wt. % |
| Example 3 | 61 wt. % | 35 wt. % | 4 wt. % (Preparation Example 1) | 0.12 wt. % |
| Example 4 | 60 wt. % | 35 wt. % | 5 wt. % (Preparation Example 1) | 0.15 wt. % |
| Example 5 | 62 wt. % | 35 wt. % | 3 wt. % (Preparation Example 3) | 0.06 wt. % |

Comparative Example 2

AgCdO electrical contact material having an Ag content of 80% by weight was prepared.

Comparative Example 3: Preparation of a Composite Material for Electrical Contact by Chemical Synthesis Ag-coated carbon nanotubes were mixed with an alloy containing 65% by weight of Ag and 35% by weight of Ni to prepare a powder mixture as follows.

0.04 g of carbon nanotubes were put into a 7M nitric acid ($HNO_3$) solution, and ultrasonic dispersion and acid treatment were performed for 5 minutes and 2 hours, respectively.

Then, the ultrasonically dispersed and acid-treated carbon nanotubes were washed using deionized water to pH 7 using vacuum filtration.

Then, the washed carbon nanotubes were sequentially mixed with a mixed solution of tin chloride ($SnCl_2$) and hydrochloric acid (HCl) and a mixed solution of palladium chloride ($PdCl_2$) and hydrochloric acid (HCl), and ultrasonic waves were applied to bind tin ($Sn^{2+}$) and palladium ($Pd^{2+}$) to the surface of the carbon nanotubes.

Then, 0.3 M aqueous silver nitrate ($AgNO_3$) solution and an aqueous ammonia solution were put, and the mixture was mixed until the solution was colorless, and then the carbon nanotubes to which the tin and palladium were bound to the surface were mixed.

Then, 0.1 M aqueous glyoxylic acid solution and 0.5 M aqueous sodium hydroxide (NaOH) solution were mixed until pH 9, and then the mixed solution was reacted at 90° C. for 1 hour, and then washed using deionized water to pH 7 using vacuum filtration to prepare silver-coated carbon nanotubes.

Then, a powder mixture was prepared by mixing the Ag-coated carbon nanotubes and the alloy.

Then, the powder mixture was ultrasonically dispersed, vacuum dried, and then the vacuum dried powder mixture was sintered to prepare a composite material for electrical contact. In this case, the powder mixture was sintered while maintaining the temperature at a temperature of 750° C. to 830° C. for 1 minute, and as a sintering method, a spark plasma sintering (SPS) method was used.

Experimental Example 2: Measurement of Electrical, Mechanical, and Thermal Properties The density, electrical conductivity, Vickers hardness, and thermal conductivity of the electrical contacts of Examples 1 to 5 and Comparative Examples 1 to 3 were measured, and the results are shown in Table 4 below.

TABLE 4

| Classification | Density ($g/cm^3$) | Electrical conductivity (% IACS) | Vickers hardness (HV) | Thermal conductivity, W/(m · K) 25° C. | 40° C. | 60° C. | 80° C. | 100° C. |
|---|---|---|---|---|---|---|---|---|
| Comparative Example 1 | 9.850 | 50 | 91.9 | 278.967 | 275.222 | 268.873 | 262.793 | 258.702 |
| Example 1 | 9.823 | 48 | 92.1 | 281.327 | 275.784 | 272.271 | 267.284 | 259.883 |
| Example 2 | 9.748 | 45 | 91.7 | 260.288 | 255.715 | 251.203 | 248.253 | 242.795 |
| Example 3 | 9.727 | 47 | 94.1 | 247.555 | 243.058 | 241.365 | 235.846 | 231.081 |
| Example 4 | 9.693 | 47 | 93.9 | 237.638 | 234.058 | 232.123 | 228.052 | 222.495 |
| Example 5 | 9.749 | 47 | 107.1 | 223.728 | 221.886 | 219.343 | 216.380 | 213.589 |
| Comparative Example 3 | 9.737 | 59.2 | 140 | 227.772 | 225.359 | 221.533 | 217.906 | 214.061 |

Referring to Table 4 above, it was confirmed that the electrical contacts of the present disclosure prepared by the mechanical methods of Examples 1 to 5 exhibited electrical and thermal properties in a range similar to that of Comparative Example 1 despite the low Ag content, when compared to the electrical contacts of Comparative Example 1 (Ag+Ni), which is a conventional commercial product. Further, Comparative Example 3, which is an electrical contact prepared by the conventional chemical method, exhibited excellent electrical properties and hardness, but exhibited a slightly lower thermal property compared to Examples 1 to 4.

Further, the electrical contacts of Examples 1 to 4 prepared by using multi-walled CNTs exhibited relatively superior thermal properties compared to Example 5 using single-walled CNTs.

Experimental Example 3: Electrical Lifetime Measurement

After preparing an electrical contact for switchgear with the electrical contact composite materials of Example 2, Comparative Example 2, and Comparative Example 3, the electrical contact was applied to a product, and a load was connected using a wire suitable for the product standard, and a test was performed. In this case, the electrical lifetime was measured by counting the number of on-off switching of the product by applying a six-fold current under the test current and conditions as shown in Table 5, and the results are shown in Table 6 below.

TABLE 5

| | Closed circuit | | | Circuit breaking | | |
|---|---|---|---|---|---|---|
| Class | I (current) | V (voltage) | cosϕ | I (current) | V (voltage) | cosϕ |
| AC 4 | 6 Ie | Ve | 0.35 | 6 Ie | Ve | 0.35 |

TABLE 6

| Classification | Switchgear electrical lifetime (counts) |
|---|---|
| Example 2 | 185,638 |
| Comparative Example 1 | 87,927 |
| Comparative Example 2 | 169,385 |
| Comparative Example 3 | 169,266 |

Referring to the electrical lifetime measurement results, it was confirmed that the electrical contact made only of Ag and Ni had a very poor electrical lifetime.

In addition, it was confirmed that the electrical lifetime of AgCdO (Comparative Example 2) which is a conventional cadmium-based electrical contact material and the electrical contact material prepared by chemical method (Comparative Example 3) had an electrical lifetime of about 8 to 10% lower than that of the present disclosure.

Example 6

A composite material for electrical contact (workpiece) was prepared in the same manner as in Example 1, by fixing the Ni powder to 35 wt. % and adjusting the content of the Ag powder and the Ag/C composite powder prepared in Preparation Example 2.

The content of multi-walled CNTs in the prepared composite material for electrical contact is shown in Table 7 below, and the electrical conductivity and Vickers hardness of the prepared composite material for electrical contact (workpiece) are shown in Table 7.

TABLE 7

| CNT content in composite material (wt. %) | Electrical conductivity (% IACS) | Vickers hardness (Hv) |
|---|---|---|
| 0.02 | 58 | 84.4 |
| 0.04 | 61 | 83.6 |
| 0.06 | 55 | 82.1 |
| 0.08 | 53 | 80.2 |
| 0.1 | 60 | 83.4 |
| 0.12 | 52 | 83.8 |
| 0.15 | 58 | 104.2 |
| 0.3 | 58 | 103.5 |
| 0.6 | 50 | 105.4 |
| 0.9 | 46 | 116.3 |

Referring to Table 7 above, it was confirmed that when the CNT content of the carbon-based nanofiller in the electrical contact composite material was 0.9 wt. %, the hardness was excellent, but the electrical conductivity was low at 50% IACS, and through Table 6, it was confirmed that using 0.02 wt. % to 0.90 wt. % of the carbon-based nanofiller, preferably 0.04 wt. % to 0.65 wt. %, and more preferably 0.04 wt. % to 0.40 wt. % in the total weight of the composite material was advantageous in terms of securing proper electrical properties and mechanical properties.

Through the above-described examples and experimental examples, it was confirmed that the electrical contact composite material of the present disclosure was a material that satisfies the electrical, mechanical and thermal properties required as an electrical contact material while reducing the expensive Ag content in the electrical contact. The electrical contact composite material of the present disclosure may be applied to various power equipment products such as contactors, switchgears, and circuit breakers.

Although a preferred embodiment of the present disclosure has been described above, it is apparent that various changes, modifications, and equivalents may be used in the present disclosure, and the same may be applied by appropriately modifying the above-described embodiment. Therefore, the above description does not limit the scope of the present disclosure determined by the limits of the following claims.

What is claimed is:

1. A composite material for electrical contact, comprising:

a silver (Ag) powder;

a metal-based powder including at least one selected from nickel (Ni), tungsten (W), and tungsten carbide (WC); and an Ag/C composite powder including silver (Ag) and a carbon-based nanofiller, wherein the Ag/C composite powder is a material integrated by incorporating and dispersing carbon-based nanofillers in the Ag powder, and the Ag/C composite powder has a density of 8.40 to 9.50 g/cm$^3$, wherein the carbon-based nanofiller includes at least one from the group consisting of single-walled carbon nanotubes (CNTs), multi-walled carbon nanotubes, and graphene, wherein when measuring thermal conductivity, the composite material satisfies 225.0 to 275.0 W/(m·K) at 60° C., 220.0 to 270.0 W/(m·K) at 80° C., and 215.0 to 265.0 W/(m·K) at 100° C.

2. The composite material for electrical contact of claim 1, wherein the composite material comprises 60 to 70 wt. % of the silver powder, 1 to 5 wt. % of the Ag/C composite powder, and the balance of the metal-based powder.

3. The composite material for electrical contact claim 1, wherein the composite material for electrical contact comprises a workpiece obtained by sintering, rolling or extruding the composite material for electrical contact.

4. The composite material for electrical contact of claim 3, wherein the composite material has a density of 9.550 to 9.840 g/cm$^3$, an electrical conductivity of 46 to 52% IACS, and a Vickers hardness of 91.0 to 95.0 HV.

5. The composite material for electrical contact of claim 3, wherein when measuring thermal conductivity, the composite material satisfies 230.0 to 285.0 W/(m·K) at 25° C., 230.0 to 280.0 W/(m·K) at 40° C.

6. A method for manufacturing a composite material for electrical contact, the method comprising performing a process, comprising:

mixing a silver (Ag) powder, a metal-based powder, and an Ag/C composite powder including silver (Ag) and a carbon-based nanofiller to prepare a mixed powder;

preparing a workpiece by sintering, rolling, or extruding the mixed powder; and heat-treating the workpiece, wherein the metal-based powder comprises at least one selected from nickel (Ni), tungsten (W), and tungsten carbide (WC), and wherein the Ag/C composite powder is a material integrated by inserting and dispersing carbon-based nanofillers into the Ag powder, and the Ag/C composite powder has a density of 8.40 to 9.50 g/cm$^3$, wherein the Ag/C composite powder is prepared by performing:

mixing the Ag powder and the carbon-based nanofiller, and then preparing a mixture obtained by performing low energy milling; and performing high energy milling on the mixture obtained by performing the low energy milling.

7. The method for manufacturing a composite material for electrical contact of claim 6, wherein the low energy milling and the high energy milling are performed independently by attrition milling, planetary milling, jet milling, or disc milling.

8. The method for manufacturing a composite material for electrical contact of claim 7, wherein the low energy milling is performed by attrition milling for 1 to 60 minutes under a condition of 100 to 200 rpm, and wherein the high energy milling is performed by attrition milling for 4 to 24 hours under a condition of 400 to 600 rpm.

* * * * *